United States Patent
Schick et al.

(10) Patent No.: US 7,913,488 B2
(45) Date of Patent: Mar. 29, 2011

(54) INTERNAL COMBUSTION ENGINE WITH SECONDARY AIR INJECTION SYSTEM

(75) Inventors: Hedwig Schick, Ludwigsburg (DE); Helmuth Fischer, Besigheim (DE); John Baumann, Grosse Pointe Farms, MI (US)

(73) Assignee: Mann+Hummel GmbH, Ludwigsburg (DE)

( * ) Notice: Subject to any disclaimer, the term of this patent is extended or adjusted under 35 U.S.C. 154(b) by 768 days.

(21) Appl. No.: 11/808,746

(22) Filed: Jun. 12, 2007

(65) Prior Publication Data
US 2008/0006031 A1 Jan. 10, 2008

(30) Foreign Application Priority Data
Jun. 12, 2006 (DE) .................. 10 2006 027 449

(51) Int. Cl.
*F01N 3/00* (2006.01)
(52) U.S. Cl. ............... 60/289; 60/274; 60/280; 60/307; 60/605.1; 60/606
(58) Field of Classification Search ............ 60/274, 60/280, 289, 290, 293, 307, 605.1, 605.2, 60/606, 611
See application file for complete search history.

(56) References Cited

U.S. PATENT DOCUMENTS

| 4,534,173 | A | * | 8/1985 | Tsukamoto | 60/606 |
|---|---|---|---|---|---|
| 5,974,791 | A | * | 11/1999 | Hirota et al. | 60/276 |
| 6,094,909 | A | | 8/2000 | Weber et al. | |
| 6,276,139 | B1 | | 8/2001 | Moraal et al. | |
| 6,334,436 | B1 | * | 1/2002 | Paffrath et al. | 123/563 |
| 6,817,173 | B2 | * | 11/2004 | Paffrath et al. | 60/293 |
| 7,162,865 | B2 | * | 1/2007 | Weigand et al. | 60/289 |
| 7,231,760 | B2 | | 6/2007 | Busch | |
| 7,260,929 | B2 | * | 8/2007 | Lehmann et al. | 60/289 |
| 2006/0096279 | A1 | * | 5/2006 | Freisinger et al. | 60/289 |

FOREIGN PATENT DOCUMENTS

| DE | 41 06 046 A1 | 1/1992 |
|---|---|---|
| DE | 100 36 269 A1 | 2/2002 |
| EP | 1 524 417 A1 | 4/2005 |
| EP | 1 722 080 A2 | 11/2006 |
| WO | WO 95/08704 A1 | 3/1995 |
| WO | WO 97/38212 A1 | 10/1997 |
| WO | WO 2006/024950 A1 | 3/2006 |

OTHER PUBLICATIONS

European Search Report dated May 26, 2008 w/English translation of pertinent portion (nine (9) pages).

* cited by examiner

*Primary Examiner* — Tu M Nguyen

(57) ABSTRACT

A method for operating a diesel internal combustion engine having a compressed air source, a diesel particulate filter situated in the exhaust gas system, and a secondary air line and secondary air compressor for introducing secondary air into the exhaust gas system of the internal combustion engine, in which the compressed air source is used to drive the secondary air compressor.

6 Claims, 2 Drawing Sheets

INTERNAL COMBUSTION ENGINE WITH SECONDARY AIR INJECTION SYSTEM

BACKGROUND OF THE INVENTION

The present invention relates to a method for operating an internal combustion engine, which has a secondary air line system for introducing secondary air into the exhaust system and to an internal combustion engine having a secondary air line system for introducing secondary air into the exhaust system.

Secondary air injection systems are used for decreasing hydrocarbon (HC) and carbon monoxide (CO) emissions during the cold start of internal combustion engines. Fresh air is blown onto the exhaust gas side using this system, and thus HC and CO are afterburned. Simultaneously, the exhaust gas temperature increases, and the catalytic converter reaches its effective operating temperature sooner.

A secondary air injection system of this general type is known, for example, from U.S. Pat. No. 6,094,909 (=WO 97/38212). The basic construction may be seen from FIG. 2. The secondary air is taken through a line 13 from the filtered air side of the intake system of the internal combustion engine upstream of a throttle valve 33 and pumped through a compressor 26 via a line 14 into the exhaust area 31. Various valves may be used to control the system. The compressor 26 may be driven by a turbine 35, corresponding to FIG. 3, which makes use of the partial vacuum produced in the intake manifold through the throttle valve 33. However, the pressure differential in the intake manifold before and after the throttle valve required for driving the turbine only arises in operating states with a closed or nearly closed throttle valve. The application known in the prior art is in gasoline engines.

The soot-laden particles in diesel motors have recently been filtered via diesel particulate filters. These diesel particulate filters become loaded with soot to a maximum permissible back pressure within hours and must then be regenerated. This regeneration is typically performed by combusting the accumulated soot. The required temperature for burning off the soot particles is preferably provided via supplemental auxiliary systems. In general, one differentiates here between continuously (passively) and discontinuously (actively) operating systems as well as corresponding combinations of both types. Active systems include diesel particulate filters having burner regeneration or having thermo-electric regeneration. Regeneration systems having fuel burners require sufficient combustion air in addition to the fuel supply. The systems with thermoelectric regeneration also require combustion air for completely burning off the soot particles.

SUMMARY OF THE INVENTION

It is therefore an object of the present invention to provide an internal combustion engine and a method for operating this internal combustion engine which ensure operation of the secondary air injection system even for diesel engines.

A further object is to provide a flow of fresh gas for use in regenerating diesel particulate filters in this way.

These and other objects are achieved in accordance with the present invention by providing a method of operating a diesel internal combustion engine comprising (a) providing a diesel internal combustion engine, the engine including an intake system for supplying air to the internal combustion engine, the intake system comprising an air intake filter for filtering the supplied air, a compressed air source, the compressed air source producing an overpressure, an exhaust gas system comprising a diesel particulate filter, and a secondary air line and secondary air compressor for withdrawing secondary air from the intake system or the environment and introducing the secondary air into the exhaust gas system; (b) driving a secondary air turbine with the overpressure of the compressed air source, and (c) driving the secondary air compressor with the secondary air turbine.

In accordance with a further aspect of the invention, the objects are achieved by providing a diesel internal combustion engine comprising an engine block having a cylinder head and a crankcase, an intake system for combustion air having an intake air filter, a pressure source, an exhaust gas system, and a secondary air system, said secondary air system comprising a secondary air compressor, a line for withdrawing secondary air from the intake system or the environment and supplying the secondary air to the secondary air compressor, at least one supply line for introducing secondary air from the secondary air compressor into the exhaust gas system, a secondary air turbine mechanically coupled to the secondary air compressor to drive the secondary air compressor, and a pressure supply line connecting the pressure source to an inlet of the secondary air turbine to drive the secondary air turbine.

The diesel internal combustion engine required for implementing the method of the present invention has an intake system having an air intake filter, the air filtered by the air intake filter being conducted through the intake system of the internal combustion engine. Furthermore, the diesel internal combustion engine has a compressed air source, a diesel particulate filter which is situated in the exhaust gas system, and a line system for secondary air. This system contains a line for withdrawing secondary air from the intake system or the environment and conducting the secondary air via a secondary air compressor into the exhaust gas system of the internal combustion engine. If the secondary air is taken from the environment, a filter element is preferably connected upstream, so that no contaminated air is drawn into the secondary air system.

According to the present invention, an overpressure of the compressed air source is used to drive a secondary air turbine of the secondary air system, and the secondary air turbine drives the secondary air compressor. A secondary air system may thus advantageously be used for fresh air enrichment of the exhaust gas posttreatment system, despite the fact that a diesel internal combustion engine does not have the required pressure differential in the intake manifold for driving the secondary air turbine. However, because a compressed air source is always available in some form in modern diesel internal combustion engines, a portion of the pressurized air available in the compressed air source may be used for driving the secondary air turbine.

In accordance with one advantageous embodiment of the present invention, an intake air compressor is driven using a turbine in the exhaust gas flow. This corresponds to a classical exhaust gas turbocharger as used in many internal combustion engines. A part of the overpressure in specific operating ranges of the internal combustion engine may be diverted through an overpressure branch and provided to drive the secondary air turbine.

According to an alternative embodiment thereto, the intake air compressor is driven using a mechanical coupling to the internal combustion engine. This corresponds to a classical compressor, which is also standard in many internal combustion engines. In this case as well, the intake air compressor includes a branch to release some of the overpressure to the secondary air turbine in specific operating ranges of the internal combustion engines.

A further alternative possibility is to use electrical energy, i.e., an electric motor, to drive the intake air compressor. This has the advantage that the intake air compressor may be driven independently of the speed of the internal combustion engine and thus may boost the torque of the internal combustion engine over a very broad range. This intake air compressor also has an overpressure branch for collecting the overpressure, the overpressure then being able to be used to drive the secondary air system.

According to another advantageous embodiment of the present invention, the compressed air source is constructed as a pressure chamber, and a portion of the stored compressed air is supplied to the secondary air turbine. It is usual to equip specific motor vehicles with compressed air chambers, especially in the utility vehicle field, because the brakes for such vehicles are applied via compressed air braking systems which always include a compressor and at least one compressed air chamber. Because the compressor always maintains the pressure in the compressed air chamber between predetermined minimum and maximum values, if the compressor output is appropriately designed, a part of the compressed air stored in the compressed air chamber may be used to drive the secondary air turbine. The turbine of the secondary air charger is used as a throttle to exploit a part of the energy released by converting it into kinetic energy and driving the compressor.

Alternatively, it is also possible to introduce the compressed air stored in the compressed air chamber directly into the exhaust gas system of the diesel internal combustion engine without a secondary air system. This may be necessary in a few cases if the application of a secondary air system would be too complicated for space reasons, or for retrofitting solutions.

It is advantageous if the outlet of the secondary air turbine is also connected to the exhaust gas system of the diesel internal combustion engine, and a regulating system is provided which regulates the secondary air supply via the secondary air compressor outlet or via the secondary air turbine outlet or via both outlets simultaneously. Air quantity losses due to a decrease in one of the air flows through one of the two outlets may thus be avoided, and a large available air volume may be achieved for fresh air enrichment in the exhaust gas posttreatment system.

To achieve better efficiency, it is advantageous to provide a second secondary air system, the outlet of the first secondary air turbine being connected to the inlet of the second secondary air turbine and the outlet of the first secondary air compressor being connected to the exhaust gas posttreatment system. The fresh air exiting from the second secondary air compressor and the second secondary air turbine is also subsequently supplied to the exhaust gas system of the diesel internal combustion engine. The secondary air compressor of the second secondary air system is preferably connected via a filter to the environment. Furthermore, the large temperature drop at the turbine sides of both stages may be used, for example, in the exhaust gas recirculation cooling, in particular with plastic pipes, or also for other assemblies. In this way, the energy is optimally converted and the efficiency of the overall system is maximized.

The diesel internal combustion engine for carrying out the method according to the present invention comprises an engine block having a cylinder head and a crankcase, an intake system for the combustion air having an intake filter, a compressed air source, and an exhaust gas system having a line system for secondary air. This line system for secondary air includes a line for withdrawing secondary air from the intake manifold or from the environment, which is connected to a secondary air compressor for the secondary air and, originating therefrom, has a supply line for the secondary air into the exhaust gas system. In addition, a line system is provided having a secondary air turbine situated therein for driving the secondary air compressor, the turbine being mechanically coupled to the secondary air compressor, and the pressure source being connected via a further line to the inlet of the secondary air turbine.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
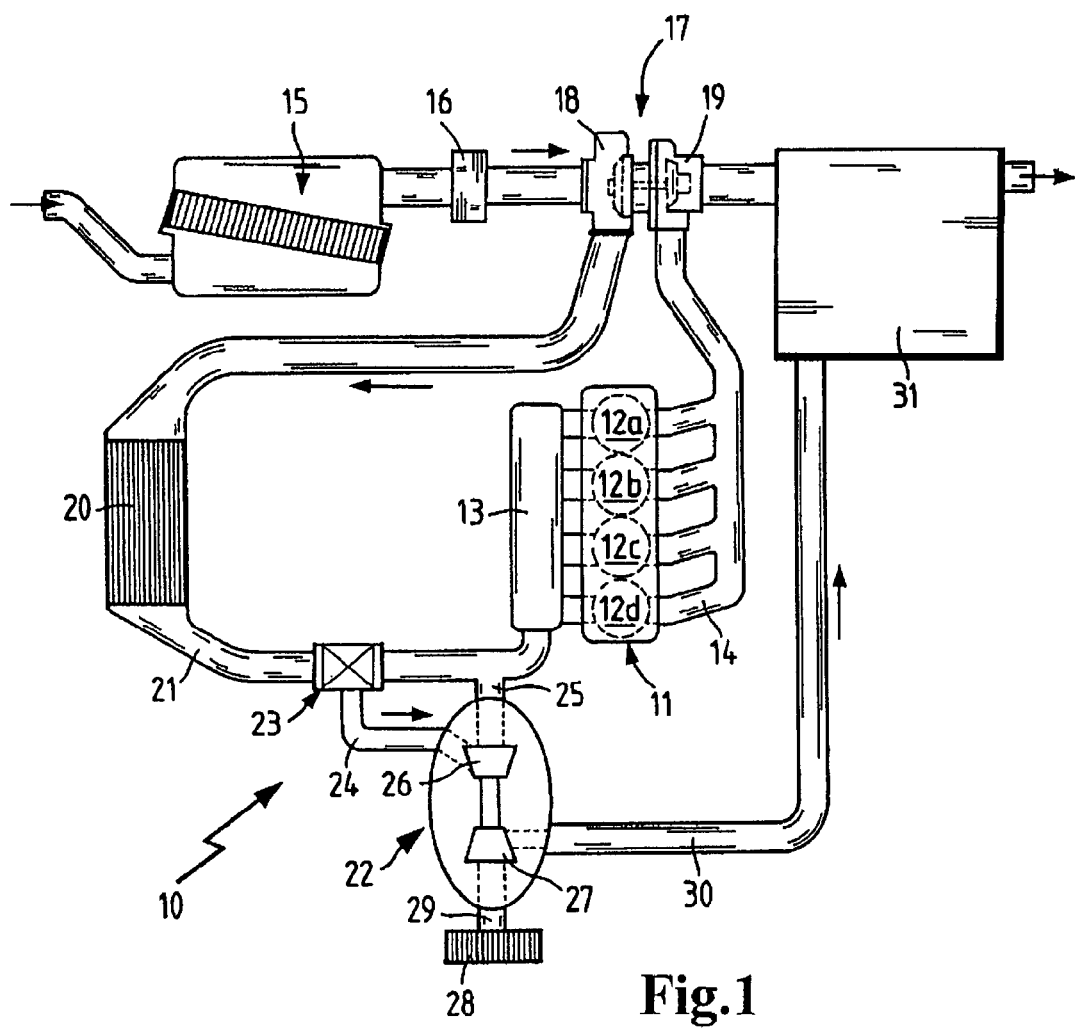
FIG. 1 is a schematic representation of a first embodiment of a diesel internal combustion engine with a fresh air supply into the exhaust gas post treatment system via secondary air chargers in accordance with the present invention.

FIG. 1 shows a diesel internal combustion engine 10 comprising a motor 11 having four cylinders 12a through 12d. An intake manifold 13 leads to these four cylinders, while the exhaust gases are removed via an exhaust manifold 14. Fresh air is filtered via an air filter 15, conducted through a mass air flow meter 16 to determine the mass volume flow and guided to an intake air compressor 18 of an exhaust gas turbocharger 17. The intake air compressor 18 is coupled to an exhaust gas turbine 19, so that the passage of combustion exhaust gases from the exhaust gas manifold 14 out through the exhaust gas turbine 19 results in compression of the intake air in the intake air compressor 18. The compressed intake air is subsequently conducted through a charge air cooler 20 and an intake line 21 to the intake manifold 13.

A secondary air system 22 is arranged to branch off from the intake line 21 at a point provided with a regulating valve 23. A secondary air turbine supply line 24, which drives a secondary air turbine 26, is connected to the regulating valve 23. After passage through the secondary air turbine 26, the branch air flow is guided through a secondary air turbine discharge line 25 back to the intake line 21.

The secondary air turbine 26 is in turn mechanically connected to a secondary air compressor 27, which takes in secondary air through an air filter 28 and a secondary air compressor supply line 29. The air filter 28 may be a separate intake air filter, however, it is also possible to withdraw filtered air from the intake air filter 15. The air supplied via the secondary air compressor supply line 29 to the secondary air compressor 27 is compressed by the secondary air compressor 27 and supplied via a secondary air compressor discharge line 30 and an exhaust gas posttreatment system 31 to the exhaust gas system. In this case, the exhaust gas posttreatment system 31 may, for example, comprise a diesel particulate filter (DPF).

Figure 2:
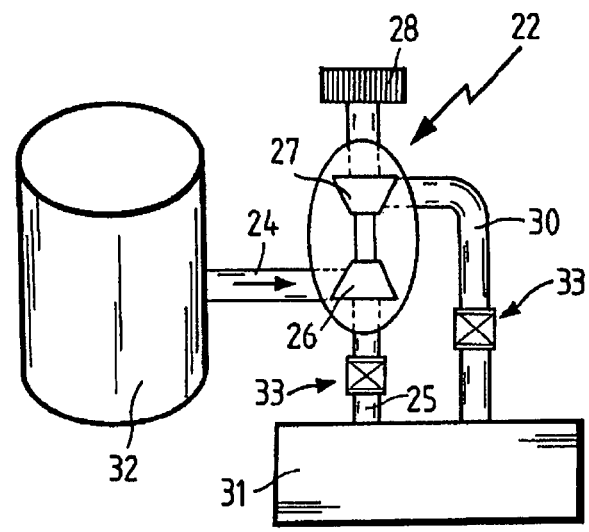
FIG. 2 is a schematic representation of a second embodiment of a diesel internal combustion engine according to the present invention.

FIG. 2 shows an alternative possibility for supplying the secondary air charger 22 with drive air for the secondary air turbine 26. Components corresponding to those in FIG. 1 are identified by like reference numerals. Similar to the embodiment of FIG. 1, this embodiment likewise comprises a motor, air filter, intake manifold and exhaust manifold. However, for simplicity of illustration, these have been omitted from the drawing.

In this embodiment, the air for driving the secondary air charger 22 is taken from a pressure chamber 32. Pressure chambers of this type are preferably used in utility vehicles having a compressed air braking system, because they also store the compressed air for operating the braking system. The compressed air may be removed in specific, predefined quantities in a targeted way via a regulator (not shown here) in accordance with the setting of a control unit, for example, and supplied to the secondary air turbine 26 via a secondary air turbine supply line 24. Furthermore, in this case the secondary air turbine discharge line 25 and the secondary air compressor discharge line 30 are connected to the exhaust gas posttreatment system 31. The respective discharge lines 25, 30 may be opened or closed individually, as a function of the fresh air demand of the exhaust gas posttreatment system via a regulating mechanism (not shown here), e.g., via valves 33.

Figure 3:
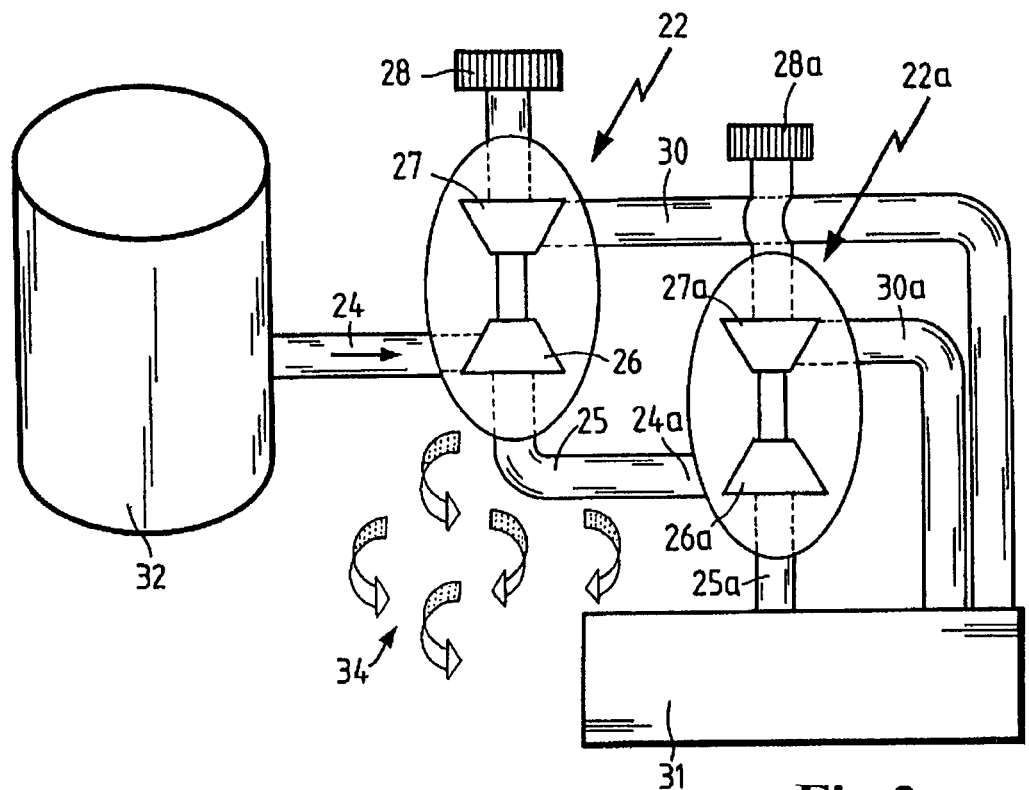
FIG. 3 is a schematic representation of a third diesel internal combustion engine embodiment according to the present invention.

FIG. 3 shows an alternative further development of the system of FIG. 2. Again, components corresponding to the preceding figures are identified by like reference numerals. In this case, the system of FIG. 2 is designed as a multistage system to achieve better efficiency. A further secondary air system 22*a* is connected following the first secondary air system 22. The secondary air turbine outlet 25 is connected to the secondary air turbine inlet 24 of the secondary air system 22*a* and the secondary air compressor outlet 30 is connected to the exhaust gas posttreatment system 31. The particular outlets of the secondary air system 22*a*, namely the secondary air turbine outlet 25 and the secondary air compressor outlet 30 of the secondary air system 22*a*, are in turn connected to the exhaust gas posttreatment system 31. The secondary air compressor 27 of the second secondary air system 22*a* is connected to the environment via an air filter 28. It is, of course, also possible in this case to include a regulating mechanism 33 corresponding to FIG. 2.

The temperature reduction arising on the particular turbine sides of the secondary air systems 22, 22*a* due to the decompression and expansion of the compressed air from the compressed air chamber 32 may be utilized or exploited, for example, by a cooler (indicated schematically by arrows 34) for exhaust gas recirculation cooling or also for additional charge air cooling.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A method of operating a diesel internal combustion engine, said method comprising:
   (a) providing a diesel internal combustion engine,
      said engine including: an intake system for supplying air to the internal combustion engine,
      said intake system comprising an air intake filter for filtering the supplied air, a compressed air source, said compressed air source producing an overpressure,
      an exhaust gas system comprising a diesel particulate filter, and a secondary air line and secondary air compressor for withdrawing secondary air from the intake system or the environment and introducing the secondary air into the exhaust gas system;
   (b) driving a secondary air turbine with the overpressure of the compressed air source, and
   (c) driving the secondary air compressor with the secondary air turbine, wherein
      the compressed air source is a pressure chamber for storing compressed air, and a portion of the stored compressed air is supplied to the secondary air turbine,
      an outlet of the secondary air turbine also is connected to the exhaust gas system of the diesel internal combustion engine, and
      a regulating system is provided for regulating secondary air supplied via the secondary air compressor or via the secondary air turbine outlet or via both the secondary air compressor and the secondary air turbine outlet.

2. The method according to claim 1, wherein
   the compressed air source is an engine intake air compressor for producing compressed intake air, and
   a specific portion of the compressed intake air is supplied to the secondary air turbine.

3. The method according to claim 2, wherein the engine intake air compressor is driven by a turbine disposed in the exhaust gas system.

4. The method according to claim 2, wherein the engine intake air compressor is driven by a mechanical coupling to the internal combustion engine.

5. The method according to claim 2, wherein the engine intake air compressor is driven by an electric drive.

6. A method of operating a diesel internal combustion engine, said method comprising:
   (a) providing a diesel internal combustion engine,
      said engine including: an intake system for supplying air to the internal combustion engine,
      said intake system comprising an air intake filter for filtering the supplied air, a compressed air source, said compressed air source producing an overpressure,
      an exhaust gas system comprising a diesel particulate filter, and a secondary air line and secondary air compressor for withdrawing secondary air from the intake system or the environment and introducing the secondary air into the exhaust gas system;
   (b) driving a secondary air turbine with the overpressure of the compressed air source, and
   (c) driving the secondary air compressor with the secondary air turbine, wherein
      the compressed air source is a pressure chamber for storing compressed air, and a portion of the stored compressed air is supplied to the secondary air turbine,
      a second secondary air system is provided, the portion of the compressed air of the secondary air turbine of the first secondary air system being supplied and the outlet of the secondary air compressor of the first secondary air system being connected to the exhaust gas system of the internal combustion engine, and
      the inlet of the secondary air compressor of the second secondary air system being connected to the environment,
      the outlet of the first secondary air turbine being connected to the inlet of the second secondary air turbine and
      the air subsequently being supplied to the exhaust gas system at the outlets of the second secondary air turbine and the second secondary air compressor.

* * * * *